United States Patent
Guttag et al.

(10) Patent No.: US 6,219,695 B1
(45) Date of Patent: *Apr. 17, 2001

(54) CIRCUITS, SYSTEMS, AND METHODS FOR COMMUNICATING COMPUTER VIDEO OUTPUT TO A REMOTE LOCATION

(75) Inventors: Karl M. Guttag, Plano; Susan Kay Duyka Harrison, Richmond, both of TX (US); Kenneth W. Schachter, Wantagh, NY (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,204

(22) Filed: Sep. 16, 1997

(51) Int. Cl.[7] .................................................... G06F 15/16
(52) U.S. Cl. .......................... 709/217; 709/205; 709/208; 709/217; 709/219; 709/224; 714/25; 714/26; 714/30; 714/31; 345/346; 345/336; 345/504; 345/2
(58) Field of Search ..................... 395/183.02, 183.03, 395/889; 709/217, 221, 237, 224, 218, 219, 203, 204, 205, 208; 445/557; 710/72; 714/25, 26

(56) References Cited

U.S. PATENT DOCUMENTS

| | | | |
|---|---|---|---|
| 4,425,625 | * 1/1984 | Seligman et al. | 379/93.31 |
| 4,785,472 | * 11/1988 | Shapiro | 379/93.19 |
| 5,268,928 | * 12/1993 | Herh et al. | 375/222 |
| 5,379,409 | * 1/1995 | Ishikawa | 345/156 |
| 5,444,849 | * 8/1995 | Farrand et al. | 709/237 |
| 5,455,933 | * 10/1995 | Schieve et al. | 710/72 |
| 5,475,691 | * 12/1995 | Chapman et al. | 370/527 |
| 5,528,748 | * 6/1996 | Wallace | 714/25 |
| 5,602,846 | * 2/1997 | Holmquist et al. | 370/384 |
| 5,650,940 | * 7/1997 | Tonozuka et al. | 709/224 |
| 5,732,212 | * 3/1998 | Perholtz et al. | 709/217 |
| 5,771,354 | * 6/1998 | Crawford | 709/229 |
| 5,819,093 | * 10/1998 | Davidson et al. | 395/704 |
| 5,822,328 | * 10/1998 | Derby et al. | 370/507 |
| 5,884,032 | * 3/1999 | Bateman et al. | 709/204 |
| 5,884,096 | * 3/1999 | Beasley et al. | 710/38 |
| 5,926,506 | * 7/1999 | Berthold et al. | 375/222 |
| 5,983,364 | * 11/1999 | Bortcosh et al. | 714/25 |
| 5,983,369 | * 11/1999 | Bakoglu et al. | 714/46 |
| 6,055,268 | * 4/2000 | Timm et al. | 375/229 |

* cited by examiner

*Primary Examiner*—Mark Rinehart
*Assistant Examiner*—William C. Vaughn, Jr.
(74) *Attorney, Agent, or Firm*—Ronald O. Neerings; Wade James Brady, III; Frederick J. Telecky, Jr.

(57) ABSTRACT

An audiovisual communications configuration comprising an interface (28) for receiving from a computer (10) a video signal output by video circuitry (15) of the computer. In this context, the video signal is output by the video circuitry of the computer for displaying an image on a first screen display (18), and the computer includes a microprocessor (15). The audiovisual communications configuration further includes circuitry (64, 66, 68, 70) for coupling a video data signal to a telephone line (40). This circuitry for coupling a video data signal is controllable independently from the microprocessor. The video data signal is representative of the video signal output by the video circuitry. Moreover, the video data signal is configured to be received from the telephone line and decoded to display an image on a second screen display (42) remote from the first screen display. Lastly, the image on the second screen display is representative of the image on the first screen display.

12 Claims, 3 Drawing Sheets

CIRCUITS, SYSTEMS, AND METHODS FOR COMMUNICATING COMPUTER VIDEO OUTPUT TO A REMOTE LOCATION

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to computer systems, and are more particularly directed to circuits, systems, and methods for communicating computer video output to a remote location.

Microprocessor-based computer systems are now prolific at all levels of the public and private sector. Such computers may be found in various uses, including business, science, personal, and entertainment. Due to this success and popularity, computer programs likewise have inundated the market. While these advances provide greater capability to the user in many respects, they also create considerable complexities as well. Sometimes these difficulties arise simply from a lack of understanding of a computer program or feature. Still other times, these difficulties arise from a problem with a computer, where that problem may be either hardware or software related. In any event, given the existence of the problem, the user may be faced with a considerable burden and frustration in seeking help to address the problem. For example, often the user must retain the services of a specialist to assist with the computer-related difficulty. Indeed, entire industries of such specialists also are evolving. The present embodiments are directed at facilitating communications between a common user and such a specialist and, more particularly, at permitting the specialist to provide his or her expertise to the user from a remote location.

Once a computer-related question or problem occurs, the specialist typically requires knowledge of the information output by the computer display in order to troubleshoot or otherwise address the user's concern. Thus, the user may in some instances merely telephone the specialist and attempt to orally convey the computer display output to the specialist. This process, however, may be inefficient, provide insufficient information, and be frustrating to either or both the user and the specialist. As an alternative, the specialist may seek first-hand access to the computer so as to view the computer display output. This approach, however, obviously requires an additional burden in that the specialist must travel to the computer or the computer must be transported to the specialist. By way of further background, some computer programs currently exist which attempt to reduce the burden in this regard. For example, the Symantec Corporation currently provides a software program entitled PC ANYWHERE, where that program may be stored on two computers and, thereafter, a first computer may communicate its screen display output to a second computer via a telephone line. Therefore, the specialist may indeed have the ability to review a problem with the user's computer without requiring first-hand access to that computer.

Given the above, the present inventors have recognized various limitations of the prior art. For example, a user may be required to bring a specialist to the site of the user's computer, and this may increase expense and possibly burden the privacy of the user. As another example, a simple telephone discussion whereby the user can only orally communicate the user's problem may be insufficient, or at least inefficient, in reconciling that problem. As yet another example, the use of a program such as the above-described PC ANYWHERE product also may have limitations. Specifically, this type of approach assumes that both the user and specialist's computers have the PC ANYWHERE (or comparable) product. Moreover, this approach also requires that the user's computer is sufficiently operational to communicate over the telephone line. In other words, if the problem of the user's computer is sufficient to freeze the computer's operations, then the computer is likely unable to run the PC ANYWHERE product and, therefore, unable to communicate the user's screen display output to the remotely-located specialist. Still further limitations will be ascertainable by one skilled in the art.

In view of the above, and as computers grow even more in popularity as well as complexity, there arises a need to permit a more efficient alternative for remote computer diagnostics. The present embodiments are directed at such needs as detailed below.

BRIEF SUMMARY OF THE INVENTION

In the preferred embodiment, there is an audiovisual communications configuration which includes an interface for receiving from a computer a video signal output by video circuitry of the computer. In this regard, the computer includes a microprocessor and video circuitry, and the video signal is output by the video circuitry for displaying an image on a first screen display located by the computer. The audiovisual communications configuration further includes circuitry for coupling a video data signal to a telephone line. This circuitry for coupling a video data signal is controllable independently from the microprocessor. The video data signal is representative of the video signal output by the video circuitry. Moreover, the video data signal is configured to be received from the telephone line and decoded to display an image on a second screen display remote from the first screen display. Lastly, the image on the second screen display is representative of the image on the first screen display. Other circuits, systems, and methods are also disclosed and claimed.

The inventive embodiments provided in this document provide numerous technical advantages over the prior art. For example, one technical advantage is that a person such as a specialist, while remotely located from a computer, will in effect be able to view the same or a substantially similar image as is being displayed by the video screen display at the location of the computer. Another technical advantage is that a single telephone connection may be used to communicate both audio and video signals between a person at the location of the computer and a person at a remote location. Still another technical advantage is that in certain embodiments the ability to communicate video data to a remote location is not under control or subject to the limitations of the control circuits of the computer providing the video output. Thus, if the computer outputting the video signal is malfunctioning in certain manners such as due to erroneous microprocessor operation, then it still will not affect the ability of the remotely located person to view the same or a substantially similar image as viewed by the person at the location of the computer. Still other technical advantages are detailed below.

DETAILED DESCRIPTION OF THE INVENTION

Figure 1:
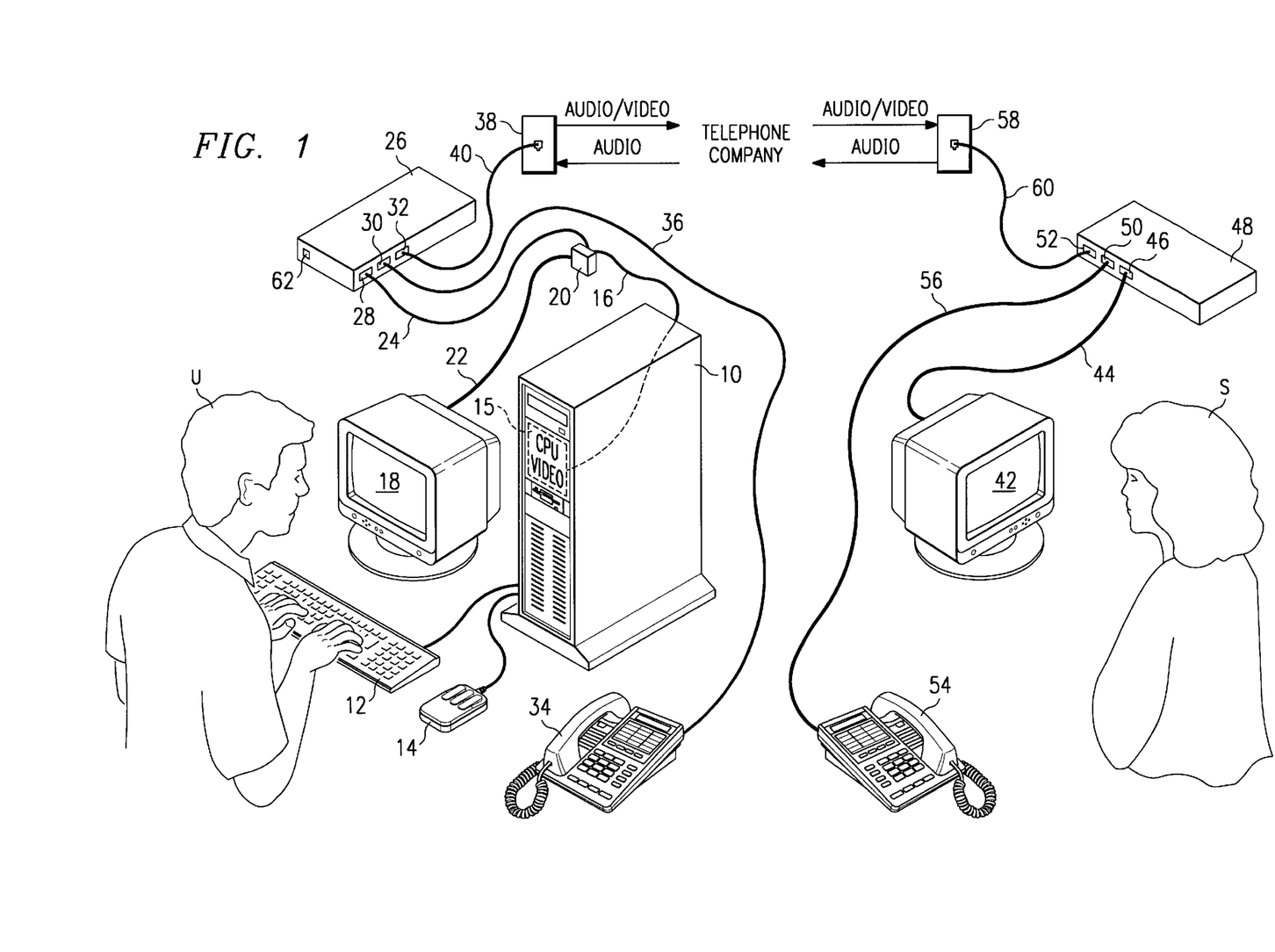
FIG. 1 illustrates the present embodiment in a context whereby a user may communicate what is displayed on the user's video screen display to a specialist at a remote location, where the specialist may then view on its own screen display an image representative of the image displayed on the user's video screen display.

FIG. 1 illustrates the preferred embodiment in accordance with the present invention and further presents a context in which that embodiment is particularly beneficial. As a matter of introduction, recall from the above Background Of The Invention section that the present embodiments involve remote computer diagnostics. In this regard, the context illustrated by FIG. 1 depicts two persons, namely, a computer user U and a computer specialist S. As better appreciated below, by way of example it is assumed that user U and specialist S are at remote locations, where each of those locations has a telephone outlet available to it so that a telephone call may be made between the two people. Thus, at the center of FIG. 1, there is shown the telephone company which provides communications in a known manner between the telephone outlet available to user U and the telephone outlet available to specialist S. Stated simply, therefore, user U and specialist S may be fairly close together, or vast distances apart, yet they both may benefit from the present embodiments. These benefits as well as the details of the inventive embodiments are presented below.

Looking now to the left of FIG. 1, there is shown user U and various devices available to user U in accordance with the present embodiments. User U is positioned to operate a computer 10, which may be of any type of known computer configurations. Typically, therefore, user U may provide input to computer 10, such as by way of a keyboard 12 and a mouse 14 (or other input or pointing device as known in the art). More pertinent to the following discussion, note also that computer 10 includes in its interior a central processing unit ("CPU") and video circuitry which are collectively shown in phantom and identified at 15, and which together couple output signals to a video output cable 16 which provides the necessary video signals to drive a video screen display 18. Note that the type of cable and video signals will depend on various standards based on the particular configuration. Under current technology for example, the video signals will most likely be that known under the VGA or SVGA standard. Thus, these signals will likely include at least three analog variable voltages, where each separate voltage corresponds to a representative of a range of intensity for red, blue, or green. Note also that these signals may include, or in part or whole may be further adapted to provide, additional signals directed to the details of video screen display 18 such as its type and synchronization technique. In any event, other standards are either known or will be ascertainable by one skilled in the art, and such a person will further comprehend how many of the present embodiments may be applied to those standards as well as the contemporary ones mentioned above.

In addition to the known components described above, note now that cable 16 is connected to a coupler 20. Coupler 20 is preferably a one-input, two-output device such that each of the video signals output by computer 10 and intended for video screen display 18 are connected to the input of coupler 20, and are then available on two different sets of outputs. Note that the internal hardware of coupler 20 also may be readily constructed given its relatively simplistic function. Assuming no loading or other complications to the signals from computer 10, a simple parallel connection may be used so that both outputs of coupler 20 provide the video signals from computer 10. If additional considerations arise, however, such as the effect of having two sets of outputs from a single input set, then such aspects may be addressed by one skilled in the art. In any event, looking to the sets of outputs of coupler 20, the first set of outputs is connected to a cable 22 connected to video screen display 18. The second set of outputs of coupler 20 is connected to a cable 24, where cable 24 provides video signals to an audiovisual communications unit 26. One skilled in the art will therefore appreciate that the same video signals which are sent to video screen display 18 are also connected to an input connector 28 of audiovisual communications unit 26. Additional aspects pertaining to audiovisual communications unit 26 are provided below.

Audiovisual communications unit 26 in general provides the ability to transmit both audio and video signals to a telephone line, and to receive audio signals from that telephone line as well. In this regard, audiovisual communications unit 26 includes input connector 28, as well as two bi-directional connectors 30 and 32. Input connector 28, as discussed above, receives the video signals from computer 10 (via coupler 20). Bi-directional connector 30 is configured to connect to a standard telephone signal, and thus is preferably a standard telephone or other applicable connector. In this regard, therefore, FIG. 1 further illustrates a telephone 34 having a standard telephone communication cable 36 connected from it to bi-directional connector 30 of audiovisual communications unit 26. Lastly, bi-directional connector 32 of audiovisual communications unit 26 is connected to provide a signal to a telephone wall outlet 38 via a standard telephone communication cable 40. Therefore, bi-directional connector 32 is also preferably a standard telephone or other telephone-compatible connector.

Concluding with an observation regarding the hardware associated with user U, note that an alternative embodiment may be formed which would increase the number of connectors of audiovisual communication unit 26 from three to five. More particularly, in FIG. 1 coupler 20 is shown as a device which is independent of the physical cabinet of audiovisual communication unit 26. However, note that as an alternative embodiment the same signal splitting function of coupler 20 may be achieved by including an additional input connector and an additional output connector as part of audiovisual communication unit 26. In this alternative, cable 16 would connect from computer 10 to the additional input connector, and cable 22 would connect from the additional output connector to video screen display 18. Thus, cable 24 would be eliminated from the illustration of FIG. 1, but there would still be some electrical conductor(s) within audiovisual communication unit 26 so that the signal received from cable 16 also could be communicated to circuitry within audiovisual communication unit 26 for reasons discussed later with respect to FIG. 2.

Looking now to the right of FIG. 1, there is shown specialist S and various devices available to specialist S in accordance with the present embodiments. Specialist S is positioned to view a video screen display 42 which, as detailed below, receives signals sufficient to inform specialist S of the information displayed on video screen display 18 at the location of user U. Continuing first with the remaining devices and connections at the location of specialist S, video screen display 42 is connected via a video cable 44 to an output connector 46 of an audiovisual communications unit 48. As in the case of user U, the type of cable and video signals used by specialist S will depend on various standards based on the particular configuration, and again may be further adapted to the details of video screen display 42.

Audiovisual communications unit 48 in general provides the ability to receive both audio and video signals from a telephone line, and to transmit audio signals back to that telephone line as well. In this regard, audiovisual communications unit 48 includes output connector 46, as well as two bi-directional connectors 50 and 52. Output connector 46, as discussed above, provides video signals to video screen display 42 (via cable 44). Bi-directional connector 50 is configured to connect to a standard telephone signal, and thus is preferably a standard telephone or other applicable connector. In this regard, therefore, FIG. 1 further illustrates a telephone 54 having a standard telephone communication cable 56 connected from it to bi-directional connector 50. Lastly, bi-directional connector 52 of audiovisual communications unit 48 is connected to provide a signal to a telephone wall outlet 58 via a standard telephone communication cable 60. Again, therefore, bi-directional connector 52 is preferably a standard telephone or other telephone-compatible connector.

Having now introduced the various components available to both user U and specialist S, reference is now made to an example of the operation of those components. Specifically, without audiovisual communications unit 26, note that user U has available to himself or herself whatever computing capabilities are provided by computer 10. Indeed, in this regard note that computer 10 may include, or communicate with, various other devices in addition to those shown in FIG. 1. However, as introduced earlier, an unfortunate byproduct of the complexity of modern computers is that sometimes those computers cause confusion and/or experience problems. These problems may range from simply operating a computer program to an action which actually freezes or "locks up" all activity of the computer. In any event, under the present embodiment, once user U incurs a computer-related complexity and requires assistance, then user U may use the present embodiments to obtain assistance from specialist S. More specifically, assume that user U is operating a program on computer 10 and sees something on video screen display 18 which is confusing to user U. Using the present embodiments, user U and specialist S may then communicate to both view and discuss the problem as appreciated below.

To initialize communication, user U first uses telephone 34 to call specialist S. However, note from the above-described physical connections that this call is made through audiovisual communications unit 26 and also, therefore, may involve some level of software (e.g., firmware) within audiovisual communication unit 26. More specifically, and as detailed below, in the preferred embodiment audiovisual communications unit 26 includes a modem, such as a digital simultaneous voice and data (DSVD) or analog simultaneous voice and data (ASVD) modem. Therefore, this modem translates the signal from telephone 34 according to known techniques and then outputs the required signals to the telephone company so that specialist S is called. Next, note that specialist S then receives the call from user U, where specialist S does so by answering telephone 54. Note here that telephone 54, however, receives this call via audiovisual communications unit 48 (which, therefore also may involve some level of software). Also as detailed later, audiovisual communications unit 48 likewise includes either a DSVD or ASVD modem which, therefore, is able to properly receive the signal of the telephone call from cable 60 and translate it so that it may be received in an ordinary audio manner using telephone 54. Therefore, at this point, note that a line for telephone communication has been established between user U and specialist S. Thus, both are free to speak with one another as they would be way of a direct connected telephone line. For reasons more clear below, however, note further that the conversation is through modems which are further capable of also communicating digital data in addition to the audio-related telephone signals.

Having established a telephone connection, user U next proceeds by enabling audiovisual communications unit 26 to send video information to specialist S preferably via the same telephone connection. This video information will enable specialist S to view on video screen display 42 either the identical or a very similar representation of the image being viewed by user U on video screen display 18. In one embodiment, this action may be taken by user U depressing a physical button 62 on audiovisual communications unit 26. As an alternative, audiovisual communications unit 26 may be programmed or configured to automatically begin transmitting the video information. In either event, audiovisual communications unit 26 begins an operation whereby it transmits data representative of the video signals received from coupler 20 to audiovisual communications unit 48 (i.e., at the location of specialist S). Note that the manner in which this transmission may occur may vary. For example, given the limited speed in which data may be currently communicated across telephone lines, a preferred current technique is for audiovisual communications unit 26 to capture an amount of video information sufficient to display one entire screen of information to specialist S. In other words, it is known in the video art that a screen display comprises a number of picture elements which are also called pixels, and that an image is displayed on a screen by activating each of these pixels according to the appropriate configuration. For example, contemporary cathode ray tube ("CRT") monitors use variable voltages representative of a range of a color, where those signals control how much red, blue, and green is mixed for a pixel, and also for how bright the pixel is to illuminate. Consequently, ultimately these signals provide a combined color and intensity for a given pixel on the monitor. Therefore, each pixel may be made to look a certain color and brightness. Still other techniques apply to other display types, such as a comparable technique for LCD displays. Moreover, another preferred aspect is for audiovisual communications unit 26 to compress the video information prior to transmitting it to audiovisual communications unit 48. Compression in this regard may be achieved in various forms as will be ascertainable by one skilled in the art. For example, one current and popular compression technique is converting data into a MPEG format. If such compression occurs, it is of course further contemplated that the data is decompressed at the receiving end of the transmission, such as by audiovisual communications unit 48 or an additional computer (not shown) connected to receive the information from audiovisual communications unit 48. In any event, given that an entire screen has a number of pixels, in response to the above-described activation, audiovisual communications unit 26 captures sufficient video information corresponding to preferably each of these pixels for at least one single image shown on video screen display 18. Thus, the amount of captured data information may be thought of as a digital snapshot of the image displayed on video screen display 18.

Either after the entire image described above is captured or, alternatively, while it is being captured, the modem (either DSVD or ASVD) of audiovisual communications unit 26 communicates this information, via the same already-established telephone connection, to audiovisual communications unit 48. Also as detailed below, audiovisual communications unit 48 includes sufficient video-related circuitry to then translate this information to sufficient signals to drive video screen display 42. In other words, upon receiving the information from audiovisual communications unit 26, audiovisual communications unit 48 then outputs a drive signal to video screen display 42 via cable 44. Therefore, when this action is complete, specialist S will see on video screen display 42 a representation of either the same, or a substantially similar, depiction of what is being displayed to user U on video screen display 18. Lastly, note that the above-described process of capturing the video signal of computer 10 and transmitting it to specialist S may be repeated as often as possible given the limits of bandwidth available over the telephone line. Thus, the snapshot image perceived by specialist S at video screen display 42 may be repeatedly refreshed or updated, so it only slightly lags in time the image actually being displayed to user U at video screen display 18. Indeed, as technology continues to advance, this lag time should continue to reduce such that eventually it may not be perceivable to specialist S at all.

Given the operations presented above, note how the present embodiments may provide vast assistance in the field of troubleshooting computer-related problems. First, note that specialist S, while remotely located from user U, will in effect be able to view the same or a substantially similar image as is being viewed by user U. Consequently, specialist S may well be in a far better position to render technical advice than if specialist S were only told orally over the telephone what actions were being displayed on video screen display 18. Moreover, note further that because the preferred embodiment uses a single telephone connection to communicate both audio and video signals, both user U and specialist S may speak to one another over the telephone while simultaneously viewing the same or a substantially similar image, again in an effort to resolve any question user U has about an occurrence of computer 10. Still further, note that this process may continuously repeat as user U and specialist S communicate in this manner. Therefore, specialist S may instruct user U to take some action, such as inputting more information to computer 10. Thereafter, if the image perceived by user U on video screen display 18 changes, then the new image will thereafter also be visible to specialist S on video screen display 42. Thus, this process may be repeated numerous times until the concern or question raised by user U is solved.

As yet another improvement of the present embodiment, note that the above operations are not under control or subject to the limitations of the control circuits of computer 10. For example, recall from the Background section above that the PC ANYWHERE product is a software program that is run by the microprocessor of a computer which may then transmit the corresponding screen display to a remote location. In contrast, however, note that the inventive embodiments herein operate independently of the control of the microprocessor of the computer being analyzed. In other words, in the context of PC ANYWHERE, if the computer being diagnosed is malfunctioning in certain manners such as due to erroneous microprocessor operation, then it may well be that the computer is unable to operate the PC ANYWHERE program and, thus, unable to communicate a video output to a remote computer. In contrast, under the present embodiments audiovisual communications unit 26 operates independently of the control of any circuitry within computer 10. Therefore, regardless of the problem or problems incurred by computer 10, the image displayed by video screen display 18 still is re-created for viewing by specialist S on video screen display 42.

As still another improvement of the present embodiment, note that the above configuration permits the specialist S to render assistance without requiring the specialist S to have a full computer available to him or her. Once again using PC ANYWHERE as an example of a contrasting prior art approach, note that it requires that both the user and the remote person both have computers, and that both have the PC ANYWHERE software on their computers. Neither of these requirements is imposed by the above embodiments.

Figure 2:
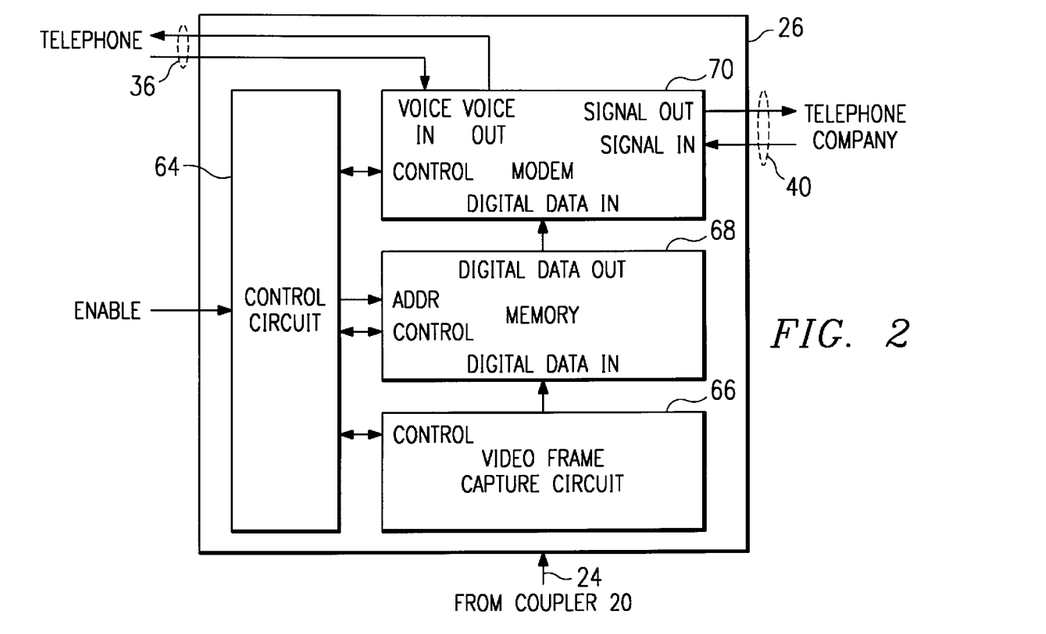
FIG. 2 illustrates an electrical block diagram of a first embodiment of the audiovisual communications unit 26 shown in FIG. 1.

FIG. 2 illustrates an electrical block diagram of the components included within one embodiment of audiovisual communications unit 26. At the outset, note that FIG. 2 is simplified and may well include additional signals as appreciated by one skilled in the art. For example, a power supply and ground signal will be used, as may be various other communications, control, and synchronization signals ascertainable by one skilled in the art. Generally, however, audiovisual communications unit 26 includes a control circuit 64 which provides appropriate signals to the remaining components shown in FIG. 2 to cause the functionality described in this document. Indeed, in this regard note that control circuit 64 may be constructed by one skilled in the art given the description of such functionality as well as the knowledge in the art. Note also that control circuit 64 is connected to receive an enable signal which is preferably asserted when user U depresses button 62 described above. In response to the enable signal, therefore, control circuit 64 is activated to commence and control the communication process as introduced above and further discussed below.

One of the circuits controlled by control circuit 64 is video frame capture circuit 66. Thus, after the user activates control circuit 64 by depressing button 62, video frame capture circuit 66 begins receiving the video signals from cable 24 and is operable to capture the information corresponding to a set of pixels on video screen display 18. Note that such capturing functionality is known in the video computer card art in other contexts. For example, many manufacturers currently produce computer cards which may be added to a computer and receive a video signal whereby that card "captures" or "grabs" a video image. In other words, the card operates to translate and/or encode the incoming video signal(s) to a form which may be used in the computer arena for viewing on a video screen display. For example, in the preferred embodiment the video signals(s) are converted to digital data such as binary representations of the color or colors to be combined for each pixel represented by the video signal(s). In any event, therefore, such technology may be used to construct video frame capture circuit 66 by one skilled in the art.

Returning to FIG. 2 and given the functionality of capturing the video signals and translating them to a computer-usable form, the translated data from video frame capture circuit 66 is output to a memory circuit 68. Memory circuit 68 may be one of various known digital memory devices, where information may be stored at various addressable locations in the memory. Indeed, note that control circuit 64 is connected to provide addresses to memory circuit 68. Therefore, as data is available from video frame capture circuit 66, control circuit 64 may issue successive addresses to memory circuit 68 so that the data is sequentially copied from video frame capture circuit 66 to different addresses in memory 68. Therefore, note that memory circuit 68 eventually will store digital data corresponding to a set of the pixels on video screen display 18.

Either while data is being stored into memory 68, or after an amount of digital data corresponding to each of the pixels on video screen display 18 is stored in memory 68, then control circuit 64 issues successive addresses to memory circuit 68 so that it outputs data to a modem 70. As mentioned earlier, in the preferred embodiment modem 70 is operable to receive both digital video data (which as now appreciated comes from memory circuit 68) as well as an analog voice signal directly from a telephone as shown by the connection to cable 36. Again, such modems are known in the art and include both the DSVD and ASVD types. In any event, these modems are known to be able to combine (sometimes referred to as multiplexing) both data and voice signals such that those signals are considered to be output simultaneously to a single telephone cable. In the present embodiment, therefore, the data being combined with the voice signal is digital video data. Given the combined information, modem 70 is further shown connected to cable 40 so that this combined information may be communicated to the telephone company for connection to an answering telephone such as telephone 54 introduced above. In any event, note further that once such a telephone connection is made, modem 70 is further capable of receiving back from the connection an additional telephone voice signal and outputting a responsive signal to cable 36. Therefore, as described above, once user U places a call using telephone 34, he or she may then both talk to, and listen to, specialist S using that same single telephone line connection.

Figure 3:
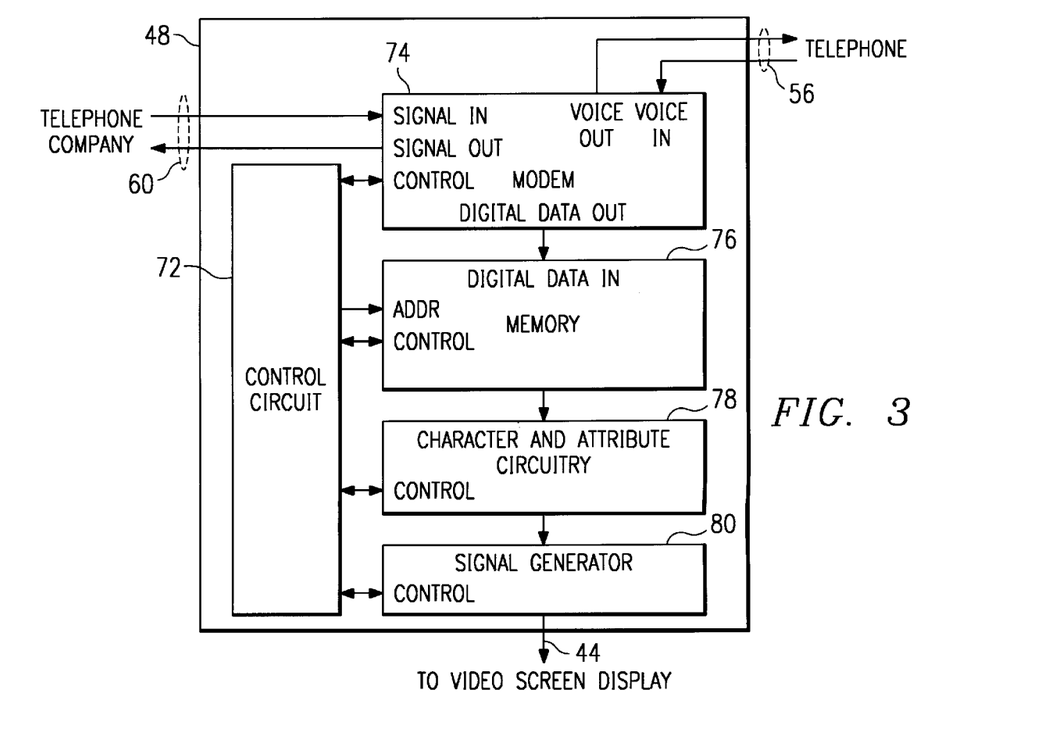
FIG. 3 illustrates an electrical block diagram of a first embodiment of the audiovisual communications unit 48 shown in FIG. 1.

FIG. 3 illustrates an electrical block diagram of the components included within one embodiment of audiovisual communications unit 48. Note that FIG. 3, like FIG. 2, is simplified and may well include additional signals as appreciated by one skilled in the art such as a power supply and ground signal, as well as other communications, control, and synchronization signals. Generally, however, audiovisual communications unit 48 includes a control circuit 72 which provides appropriate signals to the remaining components shown in FIG. 3 so as to cause the functionality described in this document. Moreover, like control circuit 64 shown in FIG. 2, control circuit 72 may be constructed by one skilled in the art given the description of such functionality as well as the knowledge in the art. Lastly, as demonstrated below, audiovisual communications unit 48 in various respects operates in the manner of a contemporary computer graphics card or graphics adapter. Thus, control circuit 72 preferably includes the functionality as provided by a video controller which may be various types of control or microprocessor devices used to implement video capability as known in the art.

One of the circuits controlled by control circuit 72 is a modem 74. Modem 74 is similar in many respects to modem 70 of FIG. 2 and, thus, the reader is referred to the above discussion for certain details. Indeed, in one respect, modems 70 and 72 are alike in that both are preferably operable to communicate voice data bi-directionally between user U and specialist S. In this regard, in FIG. 3 note that modem 74 is connected both to cable 60 and cable 56 so that bi-directional telephone communications may be made using modem 74. However, note that modems 70 and 74 may differ in that modem 70 preferably operates to only send video data to the telephone line but not to receive it from that line, while modem 74 preferably operates to only receive video data to the telephone line but not to send it to that line. For convenience, both modems may be alike and simply be connected so as not to use the additional functionality (i.e., modem 70 would include the functionality of receiving video data from the telephone line although such capability is not used, and modem 74 would include the functionality of sending video data to the telephone line although such capability is not used). In an alternative embodiment, however, and perhaps to reduce the cost and complexity of both audiovisual communications unit 26 and audiovisual communications unit 48, each modem could be separately constructed to include only the single directionality required of it. In any event, these considerations may be evaluated by one skilled in the art given particular implementation considerations.

Given the capability of modem 74 to receive video data from a telephone line, note that it is further operable to decode that data and provide it in digital form to a memory circuit 76 also included in audiovisual communications unit 48. Memory circuit 76, like memory circuit 68 of FIG. 2, also may be one of various known digital memory devices where information may be stored at various addressable locations in the memory. Note here that control circuit 72 is connected to provide addresses to memory circuit 76. Therefore, as data is available from modem 74, control circuit 72 may issue successive addresses to memory circuit 76 so that the data is sequentially copied from modem 74 to different addresses in memory circuit 76. Therefore, note that memory circuit 76 eventually will store data corresponding to a set of the pixels on video screen display 18. Moreover, as demonstrated below, note further therefore that this same information may then be translated for displaying that data on video screen display 42 as well.

The remaining blocks of audiovisual communications unit 48 include a character and attribute circuit 78 as well as a signal generator 80 as both are known in the art. Note that these blocks may include additional distinct circuits so as to support the various functions typically implemented to accommodate either text and/or graphics data, and to sufficiently process data so that it may be serialized and presented as a meaningful video drive signal(s). This video drive signal is therefore output by signal generator 80 to cable 44. Consequently, the video drive signal causes the image represented by the data stored in memory circuit 76 to be displayed by video screen display 42. Lastly, recall that the operation of audiovisual communications unit 48 may repeat for successive frames of video data. In other words, once the data in memory circuit 76 corresponding to a set of the pixels on video screen display 18 has been output by memory circuit 76, it may be replaced by a next successive set of data corresponding once again to a different set of the pixels on video screen display 18. Once again, therefore, this as well as additional successive data sets may be processed in this manner. Consequently, video screen display 42 periodically is updated with information so that it displays to specialist S an image which is identical or is substantially similar to the image perceived by user U on video screen display 18.

Having presented the various functional blocks of audiovisual communications unit 48 in FIG. 3, note an additional observation regarding the complexity of that unit. In this regard, recall that FIG. 1 illustrates audiovisual communications unit 48 as a stand-alone device which communicates, in part, to video screen display 42 for observation by specialist S. Given the components demonstrated in FIG. 4, however, note further that the functionality provided by those components may well be included in a computer device which includes many other components typical of a computer system (e.g., a central processing unit, other memory, other device cards, etc.). Thus, as an alternative to having a stand-alone device for audiovisual communications unit 48, one skilled in the art will appreciate that the functionality of the unit may be achieved using software in a larger capability computer device. In any event, either the stand-alone embodiment or a larger computer embodiment will have benefits in varying contexts. For example, if user U does not already have access to a computer, then a stand-alone unit for audiovisual communication unit 48 may present a more cost-effective approach where only the diagnostic assistance function is required. Alternatively, if user U already has a computer, then a cost-effective approach may be achieved merely by including software in that computer to accomplish the functions described in this document. Indeed, in this regard, note that still additional related functions may be achieved, such as using other functions of the computer to maintain a history of repeated diagnoses, to provide guidance in solving a problem as observed by both user U and specialist S on their respective screen displays, and still other functions as may be appreciated by one skilled in the art.

Figure 4:
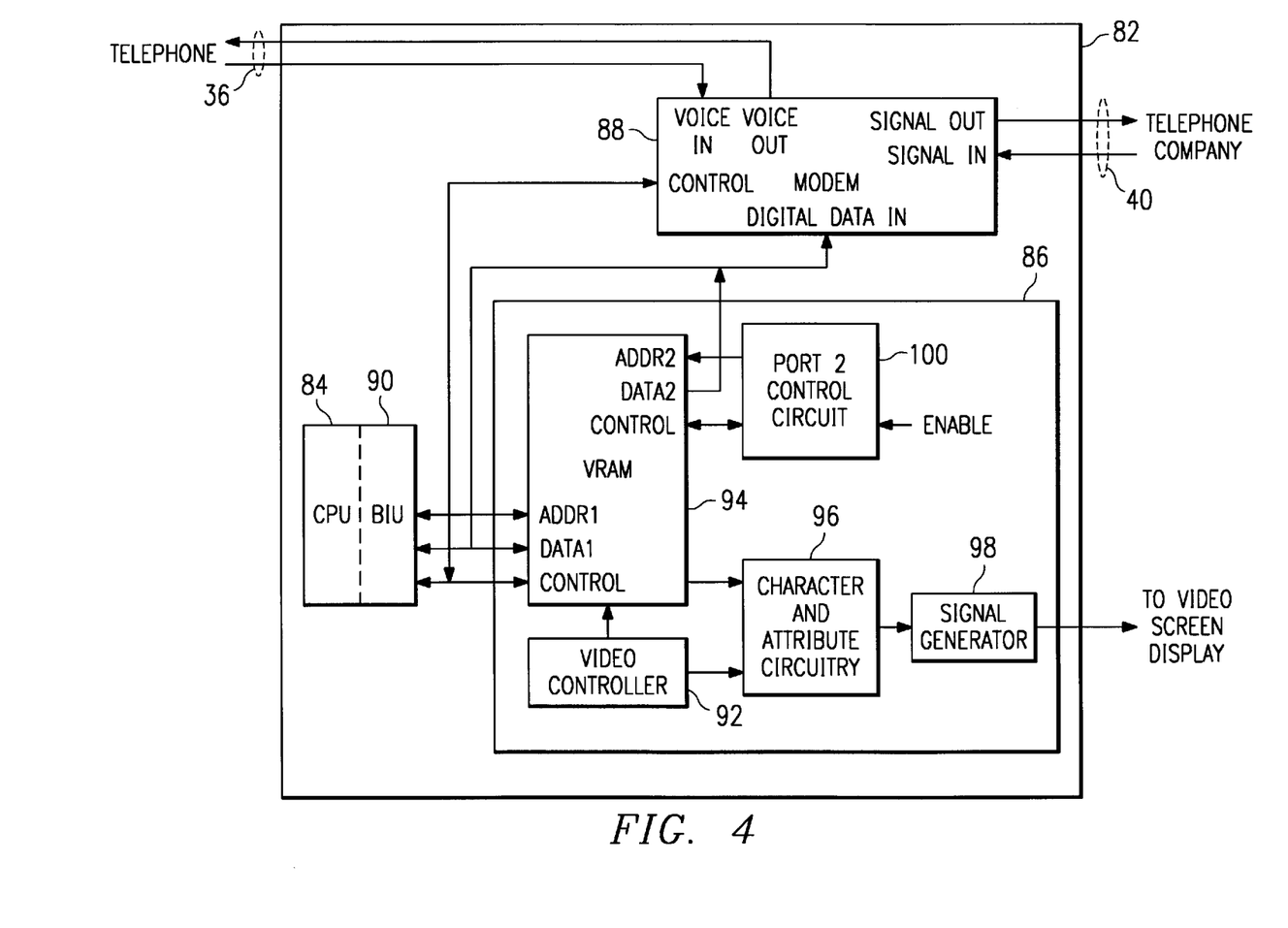
FIG. 4 illustrates an electrical block diagram of a second embodiment to be included within a computer to provide functionality comparable in certain respects to that of audiovisual communications unit 26 shown in FIG. 1.

Having described the above embodiments, FIG. 4 illustrates an electrical block diagram of an alternative embodiment which shares some of the inventive aspects of the aspects introduced above, but which departs in other manners as appreciated by one skilled in the art. Specifically, FIG. 4 illustrates a circuit configuration which may be enclosed inside the cabinet of a computer 82 and used by user U in lieu of computer 10, yet which also provides the ability for user U to simultaneously transmit voice and video signals to specialist S without a separate configuration which includes an external audiovisual communications unit 26. Before proceeding, therefore, note that each approach may have its own advantages. Audiovisual communications unit 26 of FIG. 1 (and FIG. 2) is an external device which couples into an existing computer system. Such a system may be best if user U has limited resources and/or knowledge. In other words, such a system requires only minimal activity and instruction for user U to connect it to computer 10. More specifically, user U need only connect coupler 20 in-line between computer 10 and video screen display 18 and provide power to audiovisual communications unit 26. These operations should be easily handled by most persons having the skills used to operate a computer. Moreover, by configuring the functionality of audiovisual communications unit 26 as a separate and external device, it may be retrofitted to already-purchased computers without involving the computer manufacturer. Turning now to the internal embodiment detailed below in connection with FIG. 4, note that it provides much of the above-introduced functionality and may be included by a computer manufacturer without requiring the amount of external physical connectivity of the above embodiments. Moreover, as appreciated from the detailed description below, the embodiment of FIG. 4 may in some respects share circuits which are already included in a computer and, thus, may reduce the overall complexity and cost of the device while still providing a remote video capability. Still other benefits of these contrasting approaches will be appreciated by one skilled in the art.

Turning then to FIG. 4 in detail, computer 82 includes a central processing unit ("CPU") 84 which may be any of various types of microprocessors. CPU 84 may communicate with various additional circuits, but for purposes of the present embodiment only a graphics adapter 86 and a modem 88 are shown to simplify the present discussion. More specifically, CPU is shown to communicate with both of these circuits via a bus interface unit ("BIU") 90 which is also known in the microprocessor art. Each of graphics adapter 86 and modem 88 is discussed below.

Graphics adapter 86 includes five blocks depicting different circuit functionality, four of which are common on contemporary graphics adapters. Turning first to those common circuits, they include a video controller 92 which may be various types of control or microprocessor devices used to implement video capability. Another common circuit is a video random access memory ("VRAM") 94 or some other type of data storage device which is mapped to the main memory space of CPU 84. In the present embodiment, VRAM 94 stores data again representative of the image to be displayed on video screen display 18. More specifically, this digital data includes binary representations of a range of color, again where that range may be separated such that there are three separate indications of color, one for red, one for blue, and one for green. Still further, graphics adapter 86 is also shown to include character and attribute circuitry 96 and a signal generator 98. Note that these blocks may include additional distinct circuits so as to support the various functions typically implemented to accommodate either text and/or graphics data, and to sufficiently process data so that it may be serialized to signal generator 98 and presented as a meaningful drive signal such that the desired data is output by a screen display such as video screen display 18 shown in FIG. 1. Given the above, the common circuits of graphics adapter 86 permit the video data stored in VRAM 94 to be output to video screen display 18 to display an image in the known manner of the art.

Looking now to the fifth circuit of graphics adapter 86, note that it includes a second port control circuit 100 which cooperates with a second port in VRAM 94. More specifically, returning briefly to VRAM 94, note in the present embodiment that it includes two ports, meaning two different avenues by which it may be addressed to output data. The first of these avenues is that used in the ordinary sense, that is, between VRAM 94 and CPU 84. In other words, CPU 84 may address VRAM 94 (via BIU 90) to either input data to, or output data from, VRAM 94. However, in the present embodiment, the second port provides an avenue to VRAM 94 to allow a different circuit, which here is second port control circuit 100, to independently output data from VRAM 94. Two port memories are known in the memory art. Moreover, some graphics adapter cards include items referred to as a feature bus or a feature connector which also provide a mechanism by which data may be accessed from a video RAM independently of the central microprocessor.

Given the above, note now that the second port control circuit 100 provides, in part, the ability to output to a remote user the same video data which is being output to video screen display 18. More specifically, in response to an enable signal, second port control circuit 100 may cause the video data in VRAM 94 to be output to modem 88. In the present embodiment, modem 88, like modem 70 of FIG. 2, is again capable of transmitting both voice and video signals. Therefore, once the video data is provided to modem 88, it may output that data to telephone cable 40, thereby communicating it to specialist S. Thus, specialist S may receive this data using audiovisual communications unit 48 in the same manner described above. Once again, therefore, specialist S is able to view on video screen display 42 the same, or a substantially similar, image as viewed by user U on video screen display 18.

Also in connection with FIG. 4 it is instructive to note some additional observations regarding modem 88. First, note that it is common for contemporary computers to include a modem. Therefore, one approach of implementing FIG. 4 is to use the single modem already in the computer (assuming it has both voice and digital capabilities). However, note that such an approach may have both benefits and limitations. As a benefit, the same modem already in place for other computer-related functions may be used to perform the functionality described above. Thus, resources are conserved and complexity and cost are reduced. As a possible drawback, however, note that the existing modem may be under the control of CPU 84. Therefore, if user U experiences a problem with computer 82 whereby CPU 84 renders modem 88 inoperable, then the remote video functionality likewise would be inoperable. Consequently, two other approaches may be beneficial in the embodiment of FIG. 4. As a first approach, modem 88 could be configured so that it is not under control of CPU 84 at all and, therefore, any problem with CPU 84 would not affect the modem. As a second approach, modem 88 may be constructed in a manner such that it is controllable by two different sources. Thus, CPU 84 could control modem 88, but second port control circuit 100 would have peer if not master control of modem 88. Thus, even if CPU 84 were to experience difficulties, in this latter control technique second port control circuit 100 could still interrupt modem 88 from any control of CPU 84, and then operate modem 88 in a manner sufficient to output the video information from VRAM 94.

Concluding the discussion of FIG. 4, note also the contrast of the specific type of video signal being used by it versus the embodiment of FIG. 2. Specifically, recall from FIG. 2 that video frame capture circuit 66 receives the variable voltage signals as output by the video circuitry of computer 10 and intended for video screen display 18, where those signals each represent a range of color (e.g., red, green, or blue). These signals are then configured by capture circuit 66 as well as modem 70 into a video data signal capable of being transmitted over the telephone line. In contrast, however, in FIG. 4 the video signal being output by the video circuitry (i.e., by VRAM 94) and received for telephone communications are already digital binary signals, where those signals again are representative of a range of a color but are already in digital form. Therefore, the only additional configuration of this video signal is that performed by modem 88. In either embodiment, however, a video signal of some type is intercepted and used to configure an ultimate video data signal which may be communicated across a telephone line to the video screen display of the remotely located person.

Given the embodiments provided above, one skilled in the art will appreciate many benefits provided by the inventive aspects, where many of those benefits have been set forth above. Moreover, still other benefits include the additional flexibility of the inventive scope, as may be appreciated by examples of still further variations of the present embodiments. For example, while the communication of voice and data signals is preferably over the same telephone line, as an alternative embodiment separate lines could be used and different modem technology could be used as a result. As another example, while the context between user U and specialist S is used above, the capability of remote video observation may be beneficial in other contexts as well. For example, the process of enabling the video transmission could be automated so that a remotely located person could receive the video data without having to orally communicate with a person at the sending location. Thus, the remotely located person could periodically monitor the activity at the sending site. Many other examples will be ascertainable by one skilled in the art. Consequently, while the present embodiments have been described in detail, various substitutions, modifications or alterations could be made to the descriptions set forth above without departing from the inventive scope which is defined by the following claims.

What is claimed is:

1. An audiovisual communications configuration, comprising:

a communication link having a first station and a second station, said first and second stations remote from each other, each of said first and second stations coupled to said communication link for communication between said first station and said second station;

said first station having circuitry including a CPU for providing display data and controlling said communication link, a video storage device coupled to said CPU and said communication link and having first and second control ports, one of said control ports controllable by said CPU, and a control circuit for controlling said second port;

a first display device at said first station;

circuitry at said first station for converting said display data to a visual display of said data at said first display device and applying said display data to said communication link under control of at least one of said CPU and said control circuit;

a first voice communication device at said first station coupled to said communication link for applying audio data to said communication link;

said first display device and said first voice communication device being simultaneously couplable to said communication link for simultaneously sending both audio data and display data along said communication link;

a second display device at said second station coupled by said second station to said communication link; and a second voice communication device at said second station coupled to said communication link;

said second display device and said second voice communication device being simultaneously couplable to said communication link for simultaneously receiving both said audio data and said display data transmitted along said communication link and simultaneously transmitting audio data from said second station to said first station along said communication link.

2. The audiovisual communication configuration of claim 1 wherein said circuitry includes means to simultaneously couple said first voice communication device and said first display device to said communication link for simultaneous transmission of said audio data and said display data along said communication link.

3. The audiovisual communications configuration of claim 1, wherein said communication link is a telephone line and said audio data and display data are both simultaneously transmitted along said telephone line.

4. The audiovisual communication configuration of claim 1 wherein said communication link can transmit audio data simultaneously from said first station to said second station and audio information from said second station to said first station.

5. The audiovisual communication configuration of claim 2 wherein said communication link can transmit audio data simultaneously from said first station to said second station and audio information from said second station to said first station.

6. The audiovisual communication configuration of claim 3 wherein said communication link can transmit audio data simultaneously from said first station to said second station and audio information from said second station to said first station.

7. A method of diagnosing an operation by a computer having a microprocessor, comprising the steps of:

provising a communication link having a first station and a second station, said first and second stations remote from each other, each of said first and second stations coupled to said communication link for communication between said first station and said second station, said first station having circuitry including a CPU for providing display data and controlling said communication link, a video storage device coupled to said CPU and said communication link and having first and second control ports, one of said control ports controllable by said CPU, and a control circuit for controlling said second port;

providing a first display device at said first station and circuitry at said first station for converting said display data to a visual display of said data at said first display device and applying said display data to said communication link under control of at least one of said CPU and said control circuit;

providing a first voice communication device at said first station coupled to said communication link for applying audio data to said communication link, said first display device and said first voice communication device being simultaneously couplable to said communication link for simultaneously sending both audio data and display data along said communication link;

providing a second display device at said second station coupled by said second station to said communication link;

providing a second voice communication device at said second station coupled to said communication link;

said second display device and said second voice communication device being simultaneously couplable to said communication link for simultaneously receiving both said audio data and said display data along said communication link and simultaneously transmitting audio data from said second station to said first station along said communication link;

transmitting said display data from said first station to said second station along said communication link; and simultaneously with said transmission of said display data, transmitting audio data from said second station to said first station and from said first station to said second station along said communication link.

8. The method of claim 7, wherein said communication link is a telephone line and said audio data and display data are both simultaneously transmitted along said telephone line.

9. The method of claim 7 wherein said communication link can transmit audio data simultaneously from said first station to said second station and audio information from said second station to said first station.

10. The method of claim 8 wherein said communication link can transmit audio data simultaneously from said first station to said second station and audio information from said second station to said first station.

11. The configuration system of claim 1 wherein said control circuit can override said CPU for control of said communication link.

12. The method of claim 7 wherein said control circuit can override said CPU for control of said communication link.

\* \* \* \* \*

UNITED STATES PATENT AND TRADEMARK OFFICE
CERTIFICATE OF CORRECTION

PATENT NO.   : 6,219,695 B1
DATED         : April 17, 2001
INVENTOR(S)  : Susan Kay Duyka Harrison, Karl M. Guttag, and Kenneth W. Schachter It is certified that error appears in the above-identified patent and that said Letters Patent is hereby corrected as shown below:

REMARKS

Assignee has discovered a clerical error in the above-identified patent. The order of inventorship is incorrect. The patent lists the order of inventor ship as follows: Karl M. Guttag; Susan Kay Kuyka Harrison; Kenneth W. Schachter. A Corrected Filing Receipt dated 03/08/01 was mailed to Assignee correctly listing the order of inventorship as being: Susan Kay Duyka Harrison; Karl M. Guttag; Kenneth W. Schachter. The above-identified Corrected Filing Receipt was sent in response to a Decision on a Petition under 37 CFR 1.182 granting the above-requested change. Accordingly, US Patent 6,219,695 B1 should be identified as: Harrison et al.

Signed and Sealed this

Twenty-ninth Day of January, 2002

Attest:

*Attesting Officer*

JAMES E. ROGAN
*Director of the United States Patent and Trademark Office*